(12) United States Patent
Kattoju et al.

(10) Patent No.: US 11,203,342 B2
(45) Date of Patent: Dec. 21, 2021

(54) HYBRID SYSTEM AND METHOD FOR CONSERVING REGENERATIVE BRAKING ENERGY IN A VEHICLE

(71) Applicants: Veerabhadra R Kattoju, Mahwah, NJ (US); Indira D Kattoju, Mahwah, NJ (US)

(72) Inventors: Veerabhadra R Kattoju, Mahwah, NJ (US); Indira D Kattoju, Mahwah, NJ (US)

(*) Notice: Subject to any disclaimer, the term of this patent is extended or adjusted under 35 U.S.C. 154(b) by 0 days.

(21) Appl. No.: 17/225,895

(22) Filed: Apr. 8, 2021

(65) Prior Publication Data

US 2021/0221375 A1 Jul. 22, 2021

(51) Int. Cl.

| | |
|---|---|
| *B60W 10/08* | (2006.01) |
| *B60W 30/18* | (2012.01) |
| *B60W 20/14* | (2016.01) |
| *B60W 10/30* | (2006.01) |
| *B60W 10/192* | (2012.01) |

(52) U.S. Cl.
CPC ...... *B60W 30/18127* (2013.01); *B60W 10/08* (2013.01); *B60W 10/30* (2013.01); *B60W 20/14* (2016.01); *B60W 10/192* (2013.01)

(58) Field of Classification Search
None
See application file for complete search history.

(56) References Cited

U.S. PATENT DOCUMENTS

| | | | |
|---|---|---|---|
| 8,996,222 B1* | 3/2015 | Penrod | B60L 8/006 701/22 |
| 2010/0307847 A1* | 12/2010 | Lungu | B60L 50/30 180/65.31 |
| 2018/0162382 A1* | 6/2018 | Colavincenzo | B60W 10/06 |
| 2018/0273018 A1* | 9/2018 | Follen | B60L 7/10 |

* cited by examiner

*Primary Examiner* — Todd Melton
*Assistant Examiner* — Jason R Roberson
(74) *Attorney, Agent, or Firm* — Barry Choobin; Patent 360

(57) ABSTRACT

A hybrid system for a vehicle that can capture, convert, and store the kinetic energy of the vehicle slowing down the vehicle. The hybrid system includes an electric machine that can be switched between a motor mode and a generator mode, in the motor mode the electric machine can drive the vehicle using energy stored in a battery and in the generator mode the electric machine is driven by the kinetic energy of the vehicle. An air compressor is operably coupled with the electric machine, such as the electric machine drives the air compressor in the generator mode but not in the motor mode. Air compressed by the air compressor can be stored in a tank and the compressed air can be later converted to electrical energy by an air motor for charging the battery.

13 Claims, 7 Drawing Sheets

HYBRID SYSTEM AND METHOD FOR CONSERVING REGENERATIVE BRAKING ENERGY IN A VEHICLE

FIELD OF INVENTION

The present invention relates to automobiles, and more particularly, the present invention relates to a hybrid system and method for conserving regenerative braking energy from a vehicle.

BACKGROUND

Vehicles have braking systems for slowing down and bringing the vehicle to a halt. Generally, a braking system using the force of friction to reduces the kinetic energy of the vehicle. A typical braking system includes components that rub against each other for converting kinetic energy to heat energy. However, friction-based braking systems have several drawbacks. The primary drawback is a large amount of heat released heats up the rubbing components of the brake system to very high temperatures, which in turn reduces the efficiency of braking. So, a proper cooling arrangement must be provided. Second is the wear and tear of the rubbing components, those must be replaced frequently, thus increases the cost.

The regenerative braking system, although a very old technology, is increasingly being used in pure and hybrid electric vehicles due to technological advancements. However, conserving a large amount of energy released in a very short span of time from the regenerative braking system is still a big challenge. To store more energy, larger batteries and motors may be needed, which increases the weight of the vehicle drastically. The increased weight negatively affects the performance and efficiency of a vehicle.

Thus, it is desirable to have a system that can store a large amount of energy in a short span of time and without much increasing the weight of a vehicle.

SUMMARY

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a hybrid system for a vehicle that can store a large amount of regenerative braking energy in a short span of time.

It is another object of the present invention that the system does not much increase the weight of the vehicle.

It is still another object of the present invention that the system provides an alternate means of storing energy for driving the vehicle.

It is an additional object of the present invention that the system can also be charged by an external power source.

It is a further object of the present invention that the system is light in weight.

It is still a further object of the present invention that the system is economical to manufacture and install.

It is yet another object of the present invention that the system provides for maximizing the fuel efficiency of the vehicle.

It is yet a further object of the present invention that the system has a very long functional life.

In one aspect, the disclosed hybrid system includes an electric machine that can be switched between a motor mode and a generator mode, in the motor mode the electric machine can drive the vehicle using energy stored in a battery, in the generator mode the electric machine is driven by the kinetic energy of the vehicle. An air compressor is mechanically coupled to the electric machine through a coupling mechanism, such as a pulley and belt arrangement, wherein the coupling mechanism is configured such as the electric machine drives the air compressor in the generator mode but not in the motor mode.

In one aspect, the hybrid system includes the air compressor, a cylinder/tank, an air motor, and a control unit operably coupled to the air compressor and the air motor. In the generator mode, the electric machine can drive the air compressor for compressing the air which can be stored in the tank. Later, the compressed air can drive the air motor for generating electrical energy which can charge the battery.

In one aspect, the kinetic energy recovery from regenerative braking can be further boosted by using the next higher size (hp) motor for the electric machine than required. ASD can limit the power input to the electric machine in motor mode to the (required) lower size and use electric machine at full capability in the regeneration mode without increasing battery size.

The control unit can control the operation of the air motor for the smart charging of the battery. The control unit can determine the optimum time for charging the battery, for example, the air motor is not operated when the electric machine is operated in the generator mode.

In one aspect, the disclosed hybrid system can simultaneously recharge the battery and drive the air compressor.

In one aspect, the air compressor of the disclosed hybrid system can also be powered by an external power source. In one case, both the recharging circuitry of the battery and the air compressor can receive electrical energy through a common charging point in the vehicle. Alternatively, the disclosed system can have a separate plugin receptacle for the recharging circuitry of the battery and the air compressor.

These and other objects, advantages of the embodiments herein, and the summary will become readily apparent from the following detailed description taken in conjunction with the accompanying drawings.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1A:
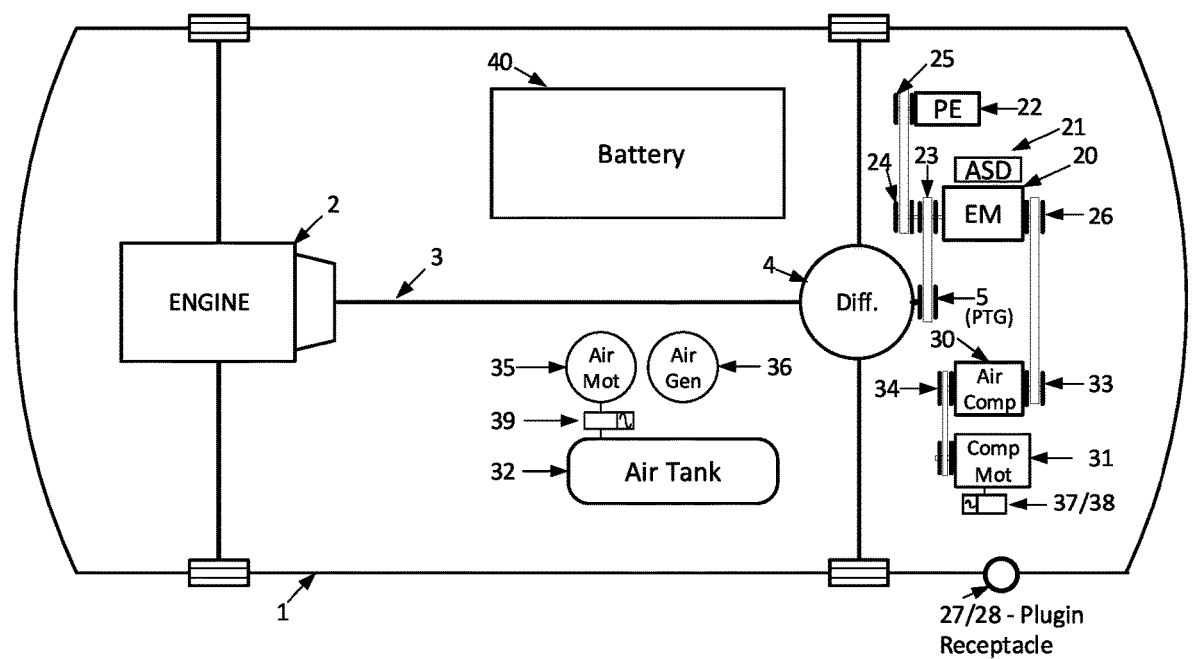
FIG. 1A is a diagram showing a vehicle having the hybrid system, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

REFERENCE NUMERALS

1: Vehicle
2: Internal Combustion Engine
3: Drive Shaft (optional for front-wheel drive vehicles)
4 & 14: Differential
5 & 15: Power Takeoff Gear (PTG)
20 & 120: Electric Machine (EM)
21 & 121: Adjustable Speed Drive (ASD),
22 & 122: Pilot Exciter (PE)
23 & 123: Flange with magnetic Clutch (F/C)
24 & 124: Pulley (to rotate Pilot Exciter)
25 & 125: Pilot Exciter Pulley
26 & 126: Pulley (Pulley with a magnetic clutch to operate the Air Compressor in regeneration mode)
27: AC Plug-in Receptacle (208V/480V 3 ph AC Plug-in Receptacle)
28: Plug-in Receptacle (120-240V AC Plug-in Receptacle)
30 & 130: Air Compressor (Air Compressor with double-ended shaft)
31 & 131: Electric Motor (Electric Motor to rotate the Air Compressor with one way Clutch Pulley)
32 &132: Tank (Compressed Air Storage)
33 & 133: Pulley (Pulley to receive power from EM shaft Pulley with built one-way Clutch)
34 & 134: Compressor drive pulley
35 & 135: Air-driven motor ("Air Mot" Compressed air-driven motor to drive Air Generator, operation of "Air Mot" can be controlled by ASD)
36 & 136: DC generator ("Air Gen")
37 & 137: Controller (Electric, 3 pole Start/Stop)
38 & 138: Controller (Electric, 2 pole Start/stop)
39 & 139: Air solenoid (to supply Air Motor—controlled by ASD)
40A & 40B: Battery Disclosed is a modular hybrid system to capture, store and utilize the kinetic energy of a moving vehicle that is slowed down or halted. The disclosed hybrid system can be used with all kinds of vehicles including pure electric, hybrid, or fuel based. The disclosed system can be easily scaled for vehicles of different sizes including large vehicles, such as multi-axle trucks. The disclosed system does not significantly increase the weight of a vehicle thus the performance and efficiency of the hybrid system can be maintained.

The disclosed hybrid system includes an electric machine (EM) that can operate as a motor to drive the vehicle or as a generator that is driven by the kinetic energy of the vehicle. The electric machine can be switched between the motor and the generator mode. In the motor mode, the electric machine can drive the vehicle. When the vehicle is slowed or halted, the electric machine switches to the generator mode which converts the kinetic energy of the vehicle to electrical energy, resulting in the slowdown of the vehicle. For example, the electric machine can be inverter grade 3 phase AC Squirrel Cage Induction Motor (with internal bearing arc protection ring) that can also work as a generator. The induction motor can be controlled by an adjustable speed drive (ASD). The EM, through ASD, can draw power from a battery also in the vehicle.

The motor can operate in parallel with the engine to offer additional horsepower as needed. AC power supplied to EM motor by the ASD establishes rotating magnetic field rotating at synchronous rpm corresponding to the frequency (set by the ASD) and the number of poles of the EM stator windings. The stator's rotating magnetic field induces voltage (electro motive force) in the (shorted) rotor bars resulting in circulating currents that interact with the rotating magnetic field to develop torque and follow it at a slightly lower rpm (percentage referred to as slip). The full load efficiency of EM in the motor mode could be up to 94%. The source of power for the motor in this application is powered by ASD with a battery which cannot be considered as a stiff bus.

Adjustable Speed Drive ASD (also known as VFD) is extensively used to power DC and AC motors by using power from utility power source, with the exception of solar-powered and off-grid applications where it is powered by batteries. The AC power supplied by ASD has up to 40% harmonic content and voltage spikes up to twice the value of the DC link Voltage (600V+ on a 300V DC bus). The ASD with the use of a built-in (preferred) programmable logic controller (PLC) has multiple functions including DC to AC conversion; regulating the speed of the motor by changing the frequency; controlling the operational modes such as constant torque, constant power, load sharing, hybrid assist in forward & reverse motion of the vehicle; precisely matching the rpm of EM (motor) to the rpm of PTG, and other functions for operating the motor parallel with internal combustion engine can be incorporated. The PLC can be programmed for additional functions or modifying the existing one. In addition to DC input from the storage batteries, ASD also requires DC voltage (typically 24V DC—not shown) for its control circuits. Also, it is to be understood that the ASD can be de-energized with the vehicle's engine and the ignition are off OR the battery is charging from plugged in charging, but one or more control functions of the ASD can continue functioning. A single ASD can be used for two or more EMs as well.

The ASD can also provide for coupling of EM with Pilot Exciter PE (in Regeneration mode) upon sensing the application of brake or slowing down of the vehicle (reduced gas input, etc.) as confirmed by a progressive drop in rpm of Power Takeoff Gear for a predetermined time set by the vehicle manufacturer. The Pilot Exciter PE provides excitation for EM when it is working as a generator. Power Takeoff Gear (PTG) on the differential of a vehicle can be the primary interface between the vehicle and the disclosed Hybrid System for bi-directional transfer of energy.

In the regeneration mode, the rpm of (and the frequency) PE should be lower (by design) than the rotor of EM. When 3 phase AC Power from PE is applied to stator windings of EM, it sets up a rotating magnetic field in its stator. As the rpm of the rotor of EM is higher rpm than the rotating magnetic field of the stator, EM goes into regeneration mode, whereby torque applied to the EM shaft gets converted to electrical energy (minus a small amount of loss). The EM (in generator mode) converts the kinetic energy of the vehicle into electrical energy (AC). EM can supply the regenerative (AC) power to a frontend rectifier to be converted to DC to charge the battery. The full load efficiency of EM in the generator mode could be up to 84%. The power for EM (in generator mode) is provided by stored kinetic energy, which is otherwise wasted as heat.

The disclosed hybrid system includes an air compressor with a storage tank and an air motor. The air compressor can work in parallel with the EM to capture kinetic energy (KE) from the vehicle and store the retrieved kinetic energy as compressed air in the storage tank. The stored energy of the compressed air can then be converted to electrical energy by the air motor. The hybrid system can include control circuitry for smart recharging of the battery using the electrical energy obtained from the compressed air. It is advantageous to operate the air motor when EM is not charging the battery. This is because the simultaneous charging of the battery from two sources may not be efficient. Since the charging of the battery by the EM cannot be delayed, the smart charging can charge the battery with the energy of compressed air at any later time. The regenerative energy captured by the electrical machine or the air compressor can be stored in a single battery, which is also used to power the motor, for driving the vehicle. The air compressor of the hybrid system can be operably coupled to the electric machine. Thus, the disclosed hybrid system can be coupled to the transmission system of the vehicle at a single interface.

The recharging of a vehicle's battery through a plug-in charging system is known to a skilled person. The battery can also be charged through an external power source, such as power from the grid, through a charging point in the vehicle. The air compressor can also be electrically driven by the external power source. An electric motor can drive the air compressor, providing an additional means for storing energy, which can be later used to charge the battery. In one case, the electric motor of the air compressor can also be powered by regenerative electrical energy from the electric machine.

Referring to FIG. 1A, which shows the disclosed hybrid system installed in vehicle 1. The hybrid system can be seen connected to a differential 4, which in turn is connected to an internal combustion engine 2 of the vehicle 1 through a drive shaft 3. Battery 40 can be used to power the disclosed hybrid system for driving the vehicle. The battery can also be recharged using regenerative energy from the hybrid system. An additional point of charge 27/28 can also be seen which can connect with an external power source. Use of plug-in receptacle 27/28 for vehicles is known to a skilled person, and any such receptacle can be used without departing from the scope of the present invention. The same receptacle can be connected to a charging circuitry of the battery and an electric motor of the air compressor. Alternatively, different plug-in receptacles can also be provided.

The electric machine 20 is operably coupled to the ASD 21. The electric machine can also be seen connected to the pilot exciter 22 through the pulleys and belts 23, 24, and 25. It is to be noted that FIG. 1A shows the components of the hybrid system connected through pulleys and belts, however, any other driving mechanism can be incorporated, without departing from the scope of the present invention. The electric machine 20 can be operably coupled to the Power Takeoff Gear 5 which bridges the connection of the electric machine 20 to the differential 4. It is to be noted that for smooth coupling of electric machine EM, pilot exciter PE, and the air compressor to the Power Takeoff Gear PTG for regeneration can be achieved by synchronizing rpm of EM to rpm of PTG.

The electric machine 20 can mechanically couple to the air compressor 30 through the pulleys 26 and 33. The electric machine can drive the air compressor only when in the generator mode. The disclosed electric machine can simultaneously generate regenerative electrical energy and drive the air compressor. The air compressor 30 can also be connected to the electric motor 31 which can rotate the air compressor 30 with a one-way clutch pulley. The electric motor 31 can have a controller 37/38. The electric motor 31 can be powered by an external power source, such as power from the grid, through the plug-in receptacle 27/28. The compressed air by the air compressor 30 can be stored in an air tank 32. The compressed air can drive the compressed air-driven motor 35 for converting the potential energy of compressed air into electrical energy. Air solenoid 39 can connect the air-driven motor 35 to the storage tank. In one case, the air solenoid can be controlled by the ASD or a separate smart power controller. A DC generator 36 can convert the electrical energy from the compressed air-driven motor 35 to DC power for charging the battery. Also, FIG. 1A shows the components air compressor, tank, and air motor as separate for illustration only, a skilled person will understand that one or more of such components can be housed together.

Figure 1B:
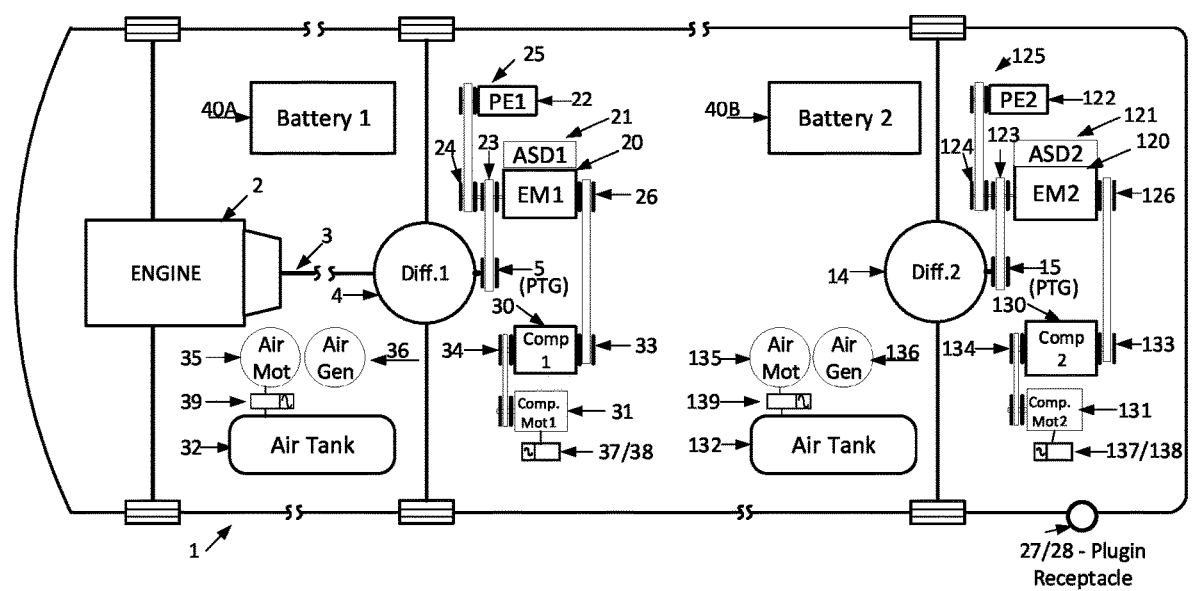
FIG. 1B is a diagram showing a vehicle having two independent hybrid systems, according to an exemplary embodiment of the present invention.

FIG. 1B shows the disclosed hybrid system for large vehicles, in which two units of the hybrid system can be coupled to the two differentials 4 and 14 through the PTG 5 and 15. Each unit of the hybrid system in FIG. 1B works as described above. FIG. 1b shows two ASDs and two batteries, however, a single ASD capable of controlling multiple motors, with a corresponding number of rectifier sections using a single battery can also be used for both units, without departing from the scope of the present invention. The use of independent systems can boost energy stored in dedicated batteries compared to the multi-hybrid systems with one ASD and one battery. AC outputs from EM1 and EM2 generators during regeneration mode could be out of phase and should be kept electrically isolated.

Figure 2:
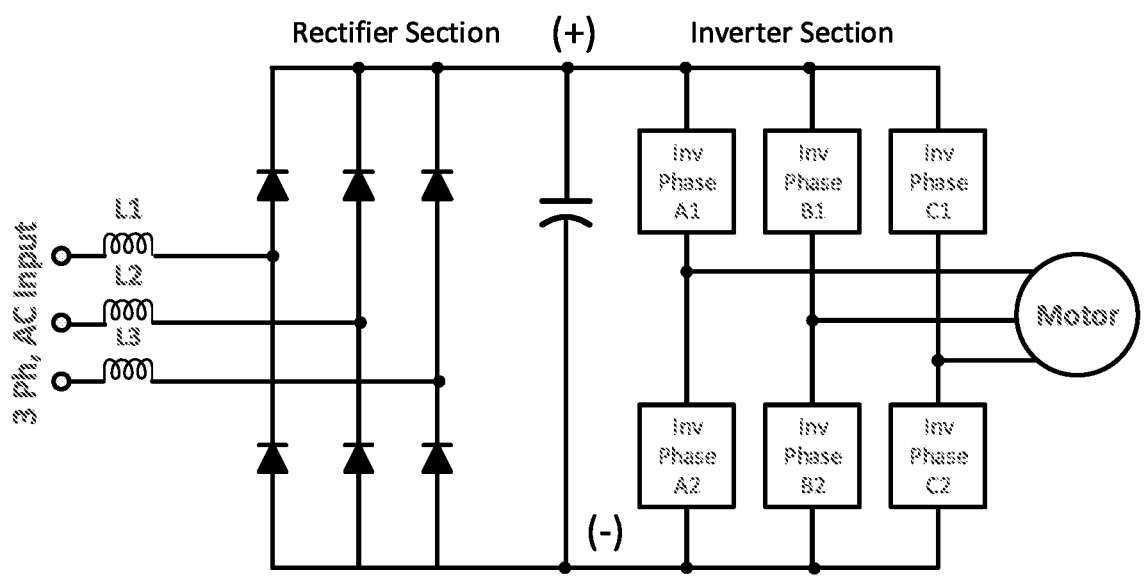
FIG. 2 is a block diagram showing a typical adjustable speed drive, according to an exemplary embodiment of the present invention.
Figure 3A:
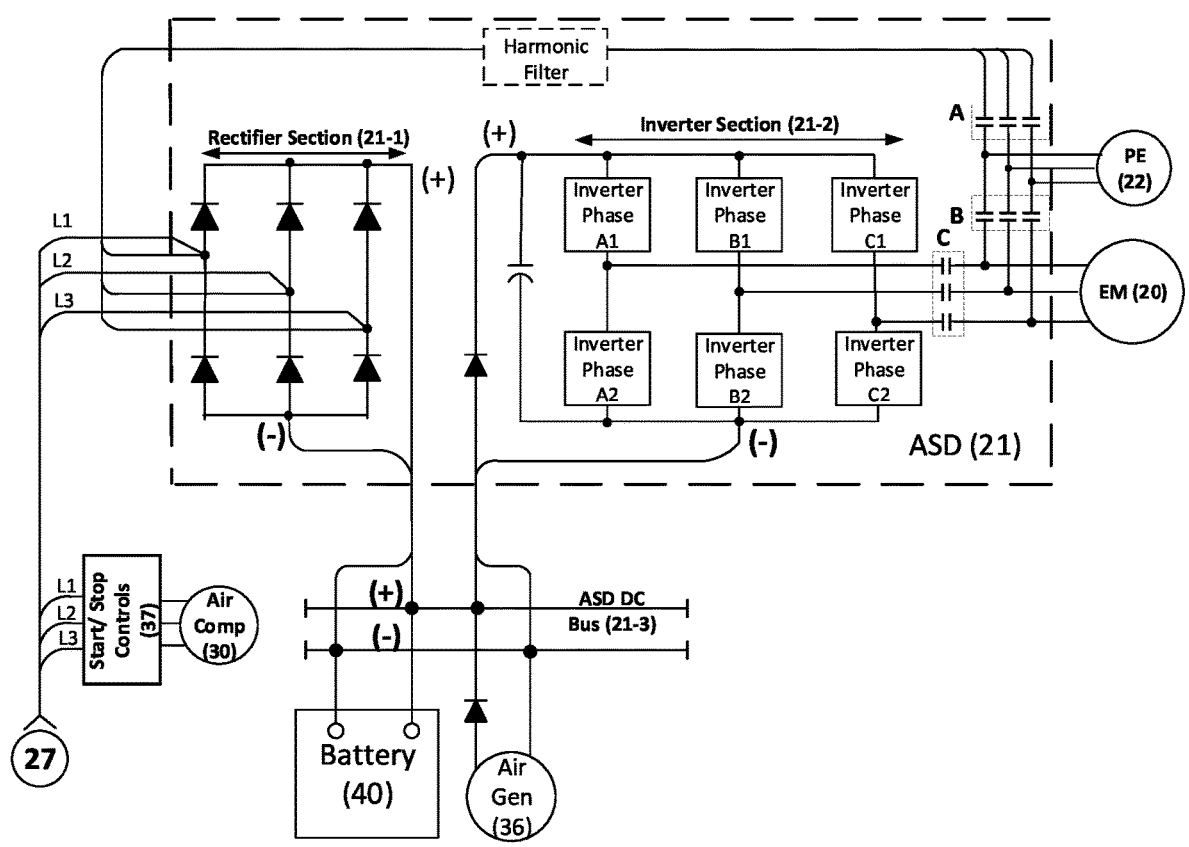
FIG. 3A is a block diagram showing a single hybrid system, according to an exemplary embodiment of the present invention.
Figure 3B:
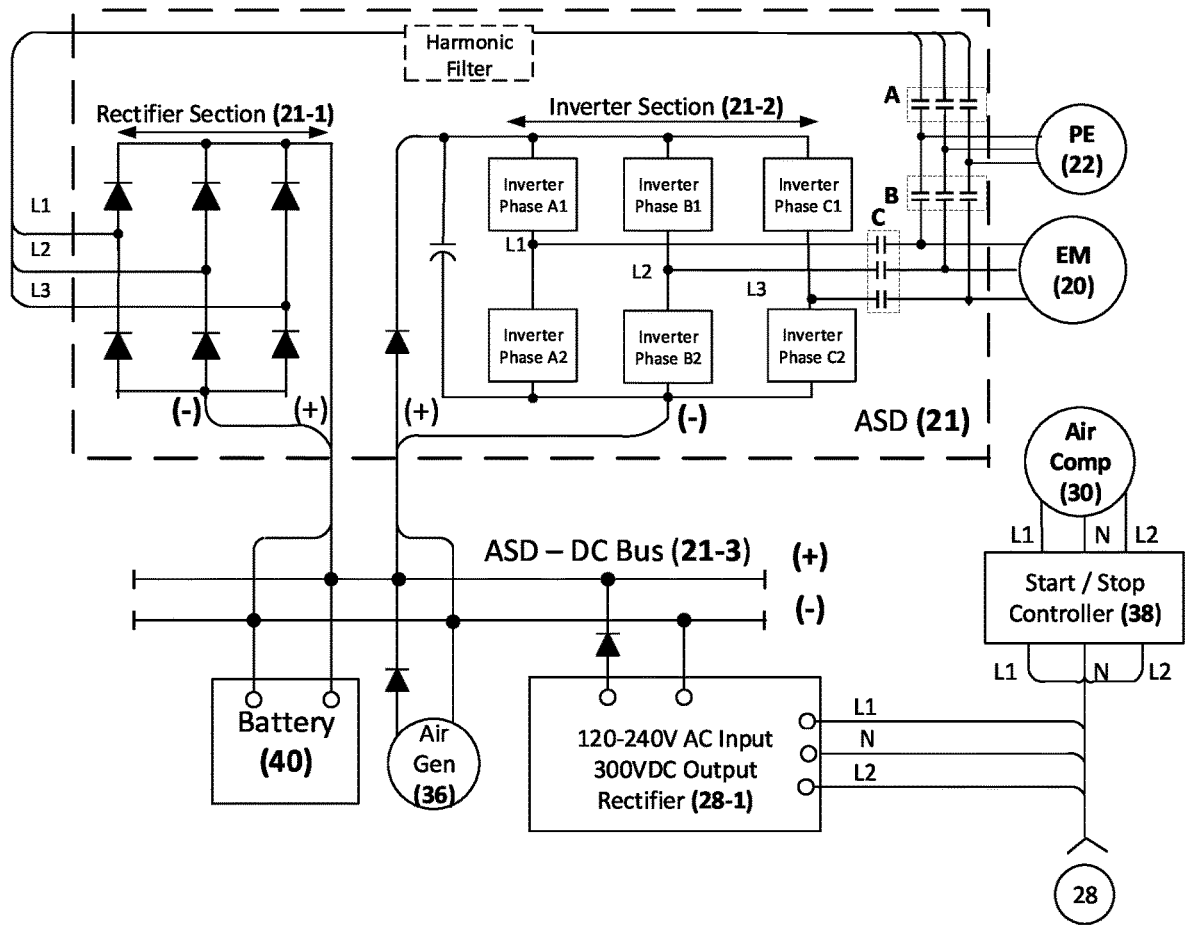
FIG. 3B is a block diagram showing another exemplary embodiment of the single hybrid system, according to the present invention.

FIG. 2 is a block diagram which is showing an embodiment of the adjustable speed drive (ASD). FIGS. 3A and 3B are a block diagram showing exemplary embodiments of the disclosed hybrid system. In FIGS. 3A and 3B, the ASD can have DC input from the DC bus as shown and a control voltage input (not shown). EM can connect to ASD only when operating as a motor through contactor C. PE and EM are connected to the frontend rectifier only when operating in regeneration mode via Contactors A & B. Harmonic filter can also be used, if required. Preferable solid-state switches in lieu of Contactors A, B & C can also be used. Also, the blocking diodes as shown in FIGS. 3A and 3B can prevent currents from ASD reaching the DC bus and circulating current between inputs to the DC bus. Open contacts "A and B" can prevent the flow of ASD output current to reach the frontend rectifier.

Element 28 in FIGS. 3A and 3B showing a Plug-in receptacle can be a point of charge in the vehicle for charging the storage battery and drive the air compressor. It may be noted that the rectifier output powered by the external power can be compliant with the battery ripple current limits and applicable safety ground requirements.

The Air Gen (36) as shown in Figures is a DC output generator driven by an air-motor for charging the battery. Alternatively, can be used an AC generator with a built-in rectifier bridge similar to an automotive alternator with DC output voltage to match the battery charging voltage requirements. Still alternatively, can be used an AC generator connected to the input side of the "rectifier charger" connected to 120-240V "Plug-in"—with an isolation contactor to prevent contact between the AC generator and the "Plug-in" AC source.

It is to be noted that PE and EM can connect to the frontend rectifier only when operating in regeneration mode via Contactors A & B. Harmonic filter can also be included, if necessary.

Figure 4A:
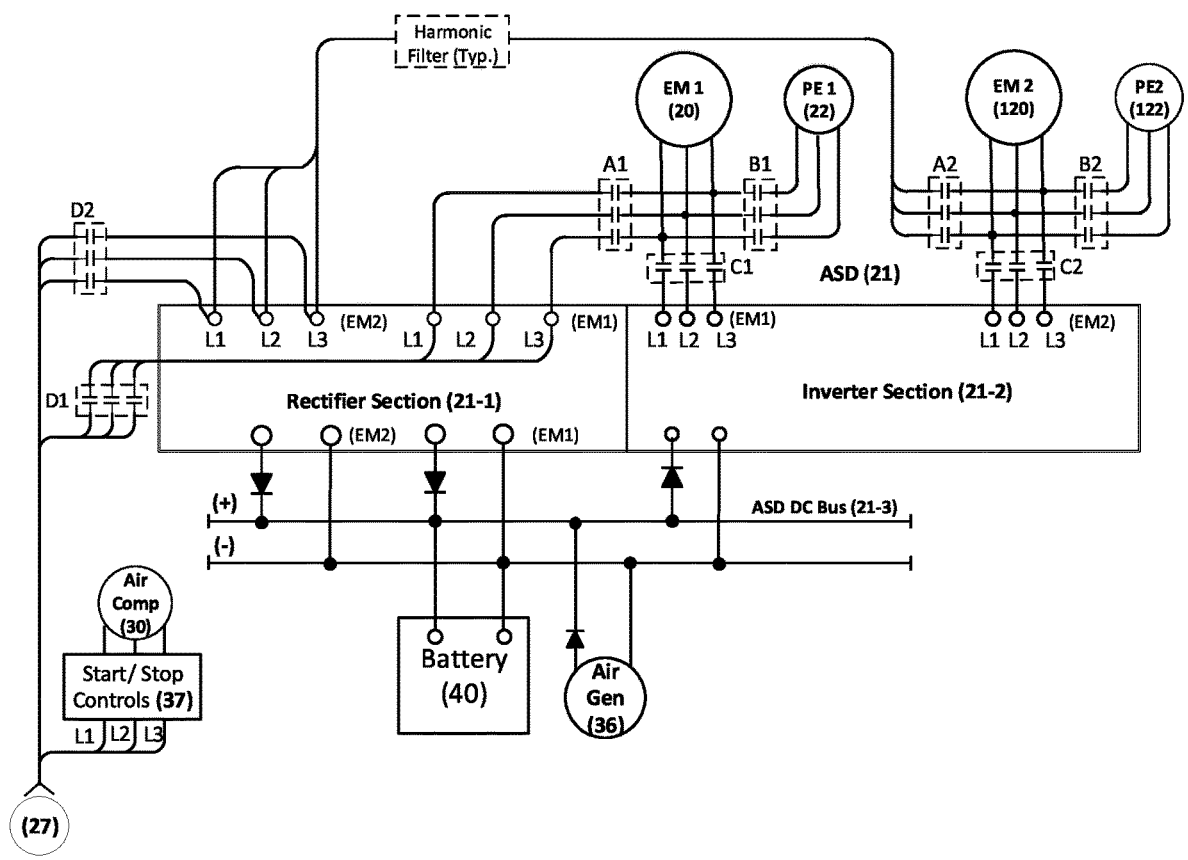
FIG. 4A is a block diagram of the multiple hybrid systems, according to an exemplary embodiment of the present invention.
Figure 4B:
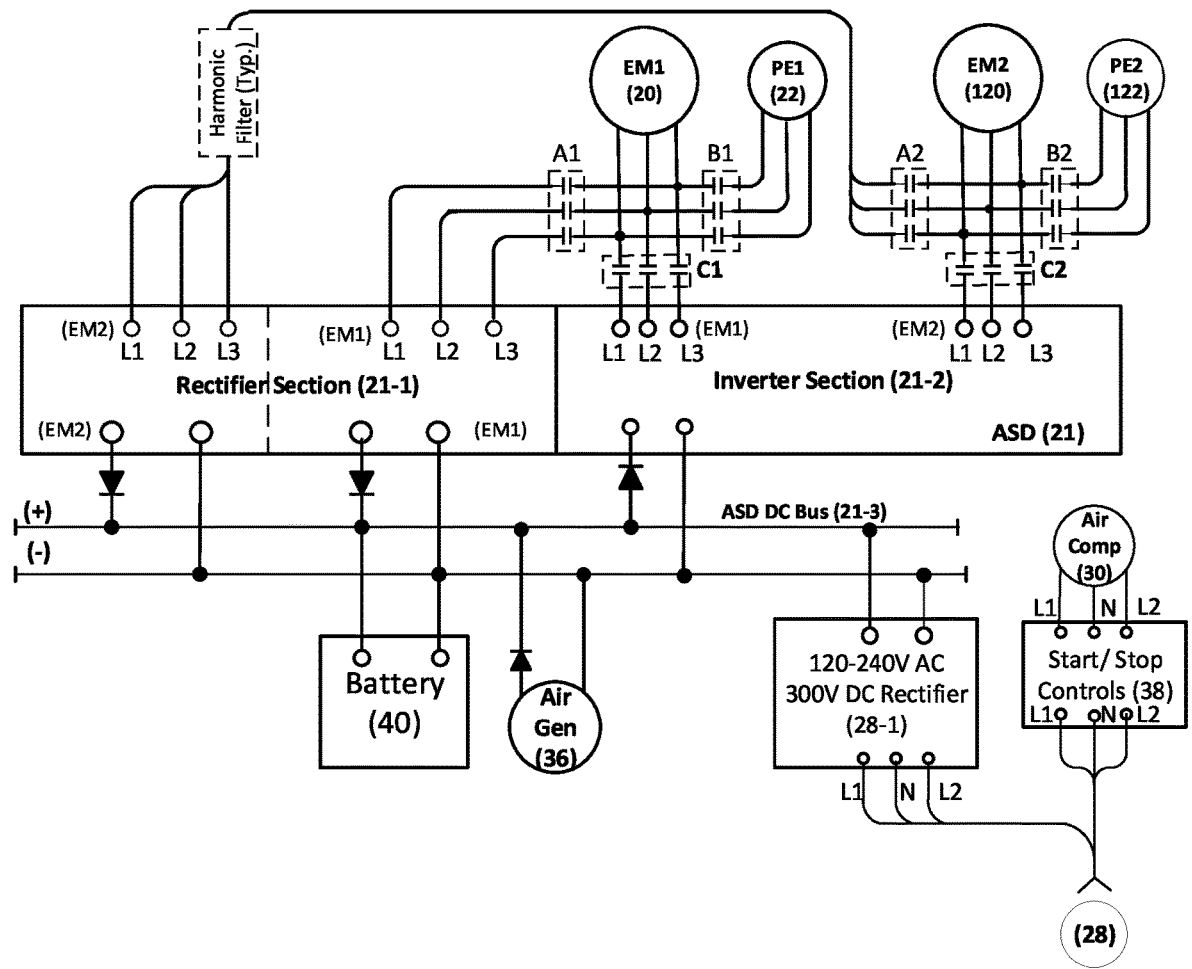
FIG. 4B is a block diagram of multiple hybrid systems, according to an exemplary embodiment of the present invention.

FIGS. 4A and 4B is showing a block diagram of the multi-hybrid system shown in FIG. 1B. The multi-hybrid system vehicles which have no electrical interconnections between individual systems can operate like Single Hybrid System vehicles, as described above. However, one or more components can be combined without departing from the scope of the present invention. For example, a single air compressor and storage tank can be used. ASD can have DC input as shown from the DC bus and a control voltage input (not shown). EM-20 and EM-120 can connect to ASD-21 when operating as a motor through respective Contactors C1 and C2. PE-22 & PE-122 and EM-20 & EM-120 can connect to their respective frontend rectifiers when operating in regeneration mode via respective Contactors A1, B1 & A2, B2. Harmonic filters can also be used, if necessary. Contactors A, B & C can be replaced by solid-state switches (Current Paths). The blocking diodes as shown prevent circulating currents between DC sources connected to the DC bus & block the flow of harmonic currents from ASD reaching the battery.

Below Table 1 shows the regenerative energy recovered and energy drawn (spent) from the battery (shown in negative) and air compressed by the disclosed hybrid system in an exemplary embodiment. Energy: (a) Input to (EM) (Motor @ 90% efficiency) from ASD/Battery=$(-1) \times HP \times t \times 550/(90\%)$; (b). Recovered by (EM) (Generator @84% efficiency)=$HP \times t \times 550 \times (84\%)$. An example of Air Compressor includes a 7 hp & 60-gallon tank, fill time 5 mins, 12 gal/min/1 gal/5 secs.; 2 cfm @ 90 psi Air Motor with 1.5 kW Generator. In operation, there can be a progressive reduction of the energy stored in the battery, which can be partly replenished by energy stored in compressed air through the air-motor. Provided the air-motor may not operate when the EM is in generator mode. A programmable controller unit can smartly control the charging of the battery from the EM, external power source, and compressed air driven motor based on the operation of the vehicle. A larger air compressor and tank can store compressed air at higher pressures, such as 200 psi, which can provide more energy for charging the battery for a longer duration. Depending on the size of the vehicle, a compressor and tank of suitable capacity can be incorporated into the vehicle.

Further referring to table 1, in operation, there can be progressive reduction of energy stored in the battery. For example, taking the case of Vehicle 1 with 30 hp motor-acceleration (0 to 60 mph) in 5 seconds—draws 91,667 ft-lb's energy from the battery and deceleration (60 mph to 0) contributes 69,300 ft-lb's energy to the battery. The net loss of energy stored in battery is 22,367 ft-lb's. By using a 40 hp motor with input power limited to 30 hp will draw about 91,667 ft-lb's from the battery and working as generator at the rate of 40 hp will contribute 92,400 ft-lb's to the battery.

TABLE 1

| Vehicle Velocity, Acceleration, Energy (Spent Vs Generated) & (EM) Horsepower Ratings | | | | | | | |
|---|---|---|---|---|---|---|---|
| (A) Velocity Ft/Sec | | (B) Time | (C) (EM) Operation | (D) Energy Spent (Mot)/ Recovered (Gen) Ft-lbs. & (EM) hp. Ratings | | | (E) 135 psi Air Compressor |
| V Initial | V Final | t Sec. | Mode | 30 | 40 | 50 | & Air Generator |
| 0 | 88 (60 mph) | 5 | Motor | −91667 | −122222 | −152778 | 0 |
| 88 (60 mph) | 0 | 5 | Generator | 69300 | 92400 | 115500 | 1 gal @ 135 p5i |
| 0 | 95 (65 mph) | 5.4 | Motor | −99000 | −132000 | −165000 | 0 |
| 95 | 0 | 5.4 | Generator | 74844 | 99792 | 124740 | 1 gal @ |

TABLE 1-continued

Vehicle Velocity, Acceleration, Energy (Spent Vs Generated) & (EM) Horsepower Ratings

| (A) Velocity Ft/ Sec | | (B) Time | (C) (EM) Operation | (D) Energy Spent (Mot)/ Recovered (Gen) Ft-lbs. & (EM) hp. Ratings | | | (E) 135 psi Air Compressor |
|---|---|---|---|---|---|---|---|
| V Initial | V Final | t Sec. | Mode | 30 | 40 | 50 | & Air Generator |
| (65 mph) 0 | 95 (65 mph) | 10 | Motor | −183333 | −244444 | −305556 | 135 p5i 0 |
| 95 (65 mph) | 0 | 10 | Generator | 138600 | 184800 | 231000 | 2 gal @ 135 p5i |
| 44 (30mph) | 95 (65 mph) | 10 | Motor | −183333 | −244444 | −305556 | 0 |
| 95 (65 mph) | 44 (30 mph) | 10 | Generator | 138600 | 184800 | 231000 | 2 gal @ 135 p5i |
| 0 | 44 (30 mph) | 10 | Motor | −183333 | −244444 | −305556 | 0 |
| 44 (30 mph) | 0 | 10 | Generator | 138600 | 184800 | 231000 | 2 gal @ 135 psi |

Electric Machine (EM)

The electric machine can be an inverter grade 3 phase AC Squirrel Cage Induction Motor (with internal bearing arc protection ring) that also works as a generator. In this application, the induction motor is powered by ASD drawing power from a battery. The EM can be switched to the motor mode by the ASD (via contactor C) after sensing the vehicle is in motion and accelerating for a predetermined time as programmed by the vehicle manufacturer. AC power supplied to EM by the ASD establishes a rotating magnetic field, rotating at synchronous rpm corresponding to the frequency (set by the ASD) and the number of poles of the EM stator windings. The stator's rotating magnetic field induces voltage (electromotive force) in the (shorted) rotor bars resulting in circulating currents that interact with the rotating magnetic field to develop torque and follow it at a slightly lower rpm (percentage referred to as slip). The EM motor rpm (with no load) can be synchronized with the rpm of PTG before coupling them by activating the magnetic clutch FC by ASD for a smooth transition. The motor can operate in parallel with the engine to offer additional horsepower as needed according to the design (acceleration, going up on an incline, etc.) of the vehicle manufacturer. The full load efficiency could be up to 94%. The source of power for the motor in this application is powered by ASD with a battery which cannot be considered as a stiff bus.

The EM can be switched to the generator mode, for slowing down the vehicle and recovering the kinetic energy, also referred herein as Recovery path 1. The Coupling of EM and PE (in Regeneration mode) is initiated by the ASD after sensing the application of brake or slowing down of the vehicle (reduced gas input, etc.) as confirmed by a progressive drop in rpm of PTG for a predetermined time set by the vehicle manufacturer. The rpm of (and the frequency) PE should be lower (by design) than the rotor of EM. When 3-phase AC Power from PE is applied to stator windings of EM it sets up a rotating magnetic field in its stator. As the rpm of the rotor of EM is higher rpm than the rotating magnetic field of the stator, EM goes into regeneration mode, whereby torque applied to the EM shaft gets converted to electrical energy (minus a small amount of loss). It is important to maintain the "slip" of the rotating magnetic field of its stator relative to its rotor of EM as designated by the motor manufacturer. Operating the rotor at higher rpm may not deliver any higher power. The EM (working as a generator) converts the kinetic energy of the vehicle into electrical energy (AC). EM will supply (AC) power to the frontend rectifier (via contacts A and B) to be converted to DC to charge the battery. The full load efficiency of EM in the generator mode could be up to 84%. The power for EM (working as the generator) is provided by stored kinetic energy, which is otherwise wasted as heat.

Adjustable Speed Drive (ASD)

Also known as VFD is extensively used to power DC and AC motors by using utility power, with the exception of solar-powered and off-grid applications where it is powered by a battery. The AC power supplied by ASD has up to 40% harmonic content and voltage spikes up to twice the value of the DC link Voltage (600V+ on a 300V DC bus). The ASD should have the provision to connect storage battery and other loads as shown in FIGS. 3A, 3B, 4A, and 4B to the DC link bus. The ASD used for this application with the use of a built-in (preferred) programmable logic controller (PLC) has multiple functions:

a) Convert DC power stored in the batteries to AC power to supply the induction motor (through a contactor).
b) Regulates the speed of the induction motor by changing the frequency.
c) Controls the operational modes such as constant torque, constant power, load sharing, hybrid assist in forward & reverse motion of the vehicle, and other functions as required by the vehicle designer.
d) Precisely match the rpm of EM (motor) to the rpm of PTG.
e) Other functions as required by the vehicle manufacturer that can be programmed through the (PLC).

In addition to DC input from the storage batteries, ASD also requires DC voltage (typically 24V DC) for its control circuits. ASD should be de-energized when the vehicle's engine and the ignition are off, or the battery is a plug-in mode for charging with the exception of any control functions required by the ASD manufacturer.

In one exemplary embodiment the disclosed ASD can provide for kinetic energy recovery boost of the regenerative braking. By using the next higher size (hp) motor for the electric machine than required. ASD can limit the power input to the electric machine in motor mode to the (required) lower size and use the electric machine at full capability in the regeneration mode without increasing battery size. For example, by using a 40 hp motor in lieu of 30 hp motor—

ASD can be programmed to limit power input to EM at 30 hp level when working as a motor and EM can operate at 40 hp capacity during regeneration mode as shown in Table 1. Additional controls may be needed for multi-module hybrid system vehicles with single ASD and battery.

Pilot Exciter (PE)

Coupling of EM (in generator mode) and the PE with PTG is initiated by the ASD after sensing the application of brake or slowing down of the vehicle (rpm of PTG) for a predetermined time set by the vehicle manufacturer. PE is required to establish a rotating magnetic field in the stator of EM to work as a generator. For optimum regeneration, the rpm (output frequency) of PE should be lower than the EM's rotor rpm by about 3%. A lower frequency can be achieved by proper selection of the drive pulley (on the EM shaft) and the driven shaft pulleys (on the PE shaft). When 3-phase AC from the PE is applied to EM stator windings, they produce a rotating magnetic field. This rotating magnetic field has lower rpm in comparison to rotor rpm (slip) that will result in regeneration, whereby torque (minus a small amount of loss) applied to the EM shaft gets converted to electrical energy in its stator. PE should have a voltage regulator to maintain the required voltage from the high to the low end of the EM rpm. It will not be possible to generate the required voltage at very low rpm values due to magnetic saturation. At a preset point, the ASD disengages EM & PE from PTG before the vehicle comes to a complete stop. The output of PE is predominantly reactive as it is merely supplying the reactive load of its own stator and that of the EM.

Air Compressor

The air compressor with a compressed air storage tank can be driven by the EM in generator mode for conserving the kinetic energy as compressed air, referred to herein as the recovery path 2. Coupling of EM (in generator mode) and the PE is initiated by the ASD (in the regeneration mode) after sensing the application of break or slowing down of the vehicle (rpm of PTG in combination with other inputs as selected) for a predetermined time set by the vehicle manufacturer. The air compressor will be set into rotation by the magnetic clutch (26), if the air pressure in the Air Tank is below the upper-pressure limit, to deliver compressed air to the Air Tank. At times, the kinetic energy of the vehicle recovered by paths 1 & 2 cannot be stored simultaneously in the battery due to the limitations of the charging current of the batteries and small variations in the voltages. By capturing the kinetic energy as compressed air stored in air tank/tanks, it can be converted into electrical energy to be stored in the batteries to meet the recharging requirements (voltage & current). It is advantageous to operate the air motor when EM is not charging the battery. The voltage regulator of Air Gen (36) will set its output to a preset voltage to charge the battery. ASD will turn on the Air Motor when the battery is not receiving charging current from EM and the pressure of the tank is within allowable limits. Compressed air driven motor coupled to a DC generator can convert compressed air into electrical energy to charge the storage battery.

Battery

The battery is the source of power for ASD. The kWh capacity and the voltage are determined by the size (hp) and voltage rating of the EM motor. Further, there is a relationship between the EM motor voltage and battery voltage when using ASD to operate the EM. For 3 ph, 480V EM motor, the battery voltage is should be 679V DC, and the 294V battery for 3 Ph, 208V EM motor. A 40 hp EM requires (minimum) 30 kWh battery. Different types of batteries are available for use with Hybrid vehicles, such as Lead-acid, Nickel Halide (NiMH), Lithium-Ion (Li-ion), etc.). NiMH and Li-ion batteries have higher power density and faster recharging rates compared to Lead Acid batteries. Charging voltage, rate of charging (amps), number of charges and discharge cycles, and the allowable level of discharge can be followed precisely for longer battery life. Example Li-ion batteries require constant current charge followed by constant voltage (at low current). This may not happen when the vehicle is in motion. Discharging batteries below 50% level may shorten battery life. The AC output from ASD can have up to 40% Harmonics and voltage spikes twice as much as the DC voltage of the battery. It is necessary to isolate ASD output from the battery as the harmonics and the voltage spikes can severely damage the battery. The front-end rectifier should meet the battery charging requirements of the battery.

Plug-in Receptacle

Charging of the batteries from an external power source, such as a grid. Most rechargeable batteries require a controlled rate of charging for a long duration. Modern batteries used for hybrid vehicles are better in terms of watts density (about 30% less weight) compared to lead-acid batteries (LAB) and recharging times of 45 minutes compared to several hours for LAB. The plug-in charge system uses a utility power/standby generator to recharge the hybrid vehicle's battery. The voltage can be 3 phase or 2 phase that is compatible with the vehicle's battery. The same source can be used to operate the air compressor to fill the air tank. Multi Hybrid system vehicles have the option of using combining system components such as ASD, Battery, air compressor, compressed air tanks, etc. A single plug-in connection can be used for Single Hybrid system and Multi Hybrid system (with isolation requirements for 3 phase input) vehicles with branch circuit wiring installed on the vehicle. Safety interlocks to prevent starting of the vehicle while the plug-in connection is physically connected should be considered. Separate plug-in connections may be necessary in special cases such as semi-trucks.

Power Takeoff Gear (PTG)

Power Takeoff Gear on the differential will be the primary interface between the vehicle and the Hybrid System for bi-directional transfer of power or another suitable interface chosen by the Vehicle manufacturer. Magnetic Clutch Flange/Coupling FC will couple the PTG to the motor/generator of the Hybrid System. ASD can synchronize the EM motor rpm to PTG rpm for smooth coupling via Magnetic Clutch and the Flange/Coupling FC. The vehicle manufacturer may feel that it is not necessary to synchronize the rpm of the rotating members under certain conditions (such as low rpm of PTG when starting from rest).

Exemplary Embodiments

I. Operation Sequence of Single Module and Multi-Module—Hybrid System Vehicle (where the Operation of Modules are Independent of Each Other)

Sequence of operation of single module hybrid as described below is applicable to each module of the multi-module hybrid system when they are independent of each other.

It is desirable to have load sharing capability between different ASDs of the Multi-Module System.

It will be easier on the Hybrid system to use the vehicle's engine to overcome the static friction and get the vehicle moving. Vehicle designers may consider this feature in starting the vehicle from rest.

Following modes of operation are considered:
1. Starting from Rest & Uniform Acceleration. (example 0 to 65 mph)
2. Deceleration to Slowdown/Come to stop. (example 65 to 0 mph)
3. Uniform Acceleration from Lower Speed to Higher Speed. (example 30 to 65 mph)

1. Starting from Rest & Uniform Acceleration (Example 0 to 65 Mph)

Engine (2) is turned "ON" by the vehicle operator. Check the status of Hybrid System components such as—Battery Voltage, Compressed Air Pressure, ASD (21) controls, engine rpm, etc., that are chosen for Hybrid System control logic. Offer alerts to the vehicle operator, as necessary.

Engine running signal sent to Turn "ON" ASD (21).

Parking brake is released, and the vehicle is put in drive, forward movement mode (auto OR manual transmission) by the vehicle operator.

AS the Vehicle (1) steadily accelerates for a preset time, ASD (21) starts the EM (20) via contactor C, in no-load mode (drive clutch FC is not yet engaged) and sets the rpm of a motor to be slightly higher than PTG (5) rpm. This will ensure that the motor of EM (20) will pick up a predetermined percentage of a load of the vehicle's engine. Check with EM (20) motor manufacturer (speed regulation) the required higher rpm for the motor in order to pick up the predetermined load.

a. ASD (21) to sends a close signal to magnetic clutch FC (23) setting the EM (20) motor in constant torque mode.
b. Upon coupling, the EM (20) will pick up some load from the vehicle's engine. The relationship between torque and horsepower of EM (20) is linear based on its rpm (hp=2πNT/33,000 where π is a constant, N is rpm and T is torque). ASD (21) to keep accelerating using PTG (5) rpm as reference progressively increasing the load on EM.
c. Additionally, dv/dt sensor and/or throttle position sensor, can be used to set the power output by the ASD (21) to EM (20).
d. EM (20) to stay coupled to PTG (5) and transfer power to the vehicle in constant torque mode till the EM (20) reaches its preset power limit OR the PTG (5) is not accelerating to go any faster OR preset elapsed time has reached.
e. As the vehicle picks up speed, the automatic OR manual transmission shifts into higher gears to reduce the engine rpm. Upon reaching preset limits of engine rpm & vehicle speed, ASD (21) to ramp down the power to EM (20) before uncoupling EM (20)—from PTG (5), by de-energizing the magnetic clutch FC (23) and open the contactor C.
f. Note that there will be an upper limit to the rpm (vehicle speed) of PTG required by the EM (20) motor manufacturer.
g. Battery voltage would be lower than when the vehicle started accelerating. ASD (21) to check the air pressure in the air tank and battery voltage. Activate the air solenoid to operate Air Mot (35) and Air Gen (36) as programmed to charge the battery.

2. Deceleration to Slowdown/Come to Stop. (Example 65 to 0 Mph)

The Vehicle moving at a constant speed and the vehicle operator applies the brakes to slow down/stop the vehicle. ASD (21) receives dv/dt (change in the rpm of PTG signal) following the brake applied signal or any other signals selected by the vehicle manufacturer for a preset time to initiate regeneration.

Kinetic Energy Recovery Path [1]:

ASD (21) starts EM (20) in motor mode (with no load) and brings its rpm close to the PTG (5) rpm. before turning off power from ASD, to drop EM motor terminal voltage to "zero volts" during the transition. (Check with the EM manufacturer time required to drop the terminal voltage to zero volts upon removal of power from the ASD.)

ASD (21) checks that contactor C to interrupt the power from the ASD to EM (20) is open before energizing magnetic clutch FC (23) to couple EM (20), PE (22) with the PTG (5). (Note that attempt to couple EM at higher rpm than the rpm of PTG may result in time delay).

Vehicle manufacturer may choose to skip starting EM (with no load) using power from ASD—before coupling F/C with PTG with the use of suitable flexible coupling, eliminating need for voltage checks at EM motor terminals. This could increase the regeneration time.

a. ASD (21) checks the voltage of PE (22) to be in the acceptable range and the terminal voltage of EM motor is "zero volts" (or a low value acceptable to EM and PE manufacturers) before closing contactors A and B.
b. 3 phase voltage from PE (22) is applied to the stator windings of EM (20) to establish a rotating magnetic field in its stator.
c. By design, the rotating magnetic field EM (20) has lower rpm compared to its rotor rpm (slip) that will result in regeneration, whereby torque is applied (minus a small amount of loss) to the EM (20) shaft gets converted to electrical energy.
d. 3 phase AC power from EM (20) will be supplied via contacts A and B to the frontend diode of ASD (21) where it gets converted to DC to be stored in the battery (40). The voltage regulator of PE (22) maintains the required voltage from the high to the low end of the EM (20) rpm.
e. As the vehicle slows down, it will not be possible to generate the required voltage at very low rpm due to magnetic saturation. At the preset point, the ASD opens contactors A and B to disconnect EM (20), PE (22) from the frontend rectifier of the ASD.
f. At this point, it may still be possible to continue Kinetic Energy recovery through Recovery Path 2. The vehicle designer may take this into consideration.

Kinetic Energy Recovery Path [2]:

a. ASD checks if the pressure in the air tank is below the preset upper limit before coupling the Compressor (30) with EM (20) via magnetic clutch (26). Compressed air is delivered to compressed air tank (32).
b. ASD (21) will keep the magnetic clutch (26) closed as long as EM (20) is rotating coupled to PTG (5) AND the air tank pressure is below the upper limit.
c. At a predetermined low rpm of the compressor ASD (21) will de-energize the clutch FC (23) and clutch (26) thereby disengaging Kinetic Energy paths 1 and 2 from PTG (5).
d. Kinetic energy captured as compressed air and stored in an air tank can be used to charge the battery when the battery is not receiving charging current from EM (20) to be within allowable limits of voltage and current.
e. ASD will operate the air solenoid valve (39) to operate the Air Mot (35) and the Air Gen (36). By delaying the operation of Air Gen (36), additional KE captured via Path 2 can be transferred to the battery properly.
f. The voltage regulator of Air Gen (36) will set its output voltage to charge the battery.

3. Uniform Acceleration from Lower Speed to Higher Speed. (Example 30 to 65 Mph)

[The Vehicle is Already in Motion]

a. When ASD (21) senses that the Vehicle (1) is steadily accelerating for a predetermined time, ASD (21) starts the EM (20) motor (with no load) via contactor C (drive clutch FC is not yet engaged) and sets the rpm of a motor to be slightly higher than PTG (5) rpm. This will ensure that motor of EM (20) picks up a predetermined percentage of the load of the vehicle's engine. Check with EM (20) motor manufacturer (speed regulation) the required higher rpm for the motor to pick up desired load.

b. ASD (21) to sends a close signal to magnetic clutch FC (23) setting the EM (20) motor in constant torque mode.

c. Rest of the sequence is the same as that of a vehicle accelerating from 0 to 65 mph (items—b thru g) for a Single Hybrid System vehicle.

II. Operation Sequence of Multi-Module Hybrid System Vehicle with Single—ASD, and Battery Multi-Module Systems with two (2) systems as shown on the Multi-Module System Block diagrams 1 & 2 are considered as an example only—not limited to 2 systems only.

By using a single ASD to control multiple motors the controls may not be precise, (especially when motors are not of the same size) unless the ASD manufacturer can offer a system that can control torque and power input to individual motors.

1. If precise controls are needed, consider adopting Multi-Module System vehicles where multiple systems are independent of each other.
2. The air compressors (30 &130), the air tanks (32 &132), and the associated equipment can be consolidated into a single system as shown on the Multi-Module System Block diagrams 1 & 2.
3. It will be easier on the Hybrid system to use the vehicle's engine to overcome the static friction and get the vehicle moving. Vehicle designers may consider this feature in starting the vehicle from rest.

Following modes of operation are considered:
1. Starting from Rest & Uniform Acceleration. (example 0 to 65 mph)
2. Deceleration to Slowdown/Come to stop. (example 65 to 0 mph
3. Uniform Acceleration from Lower Speed to Higher Speed. (example 30 to 65 mph)

1. Starting from Rest & Uniform Acceleration. (Example 0 to 65 Mph)

Engine (2) is turned "ON" by the vehicle operator. Check the status of Hybrid System Components such as—Battery Voltage, Compressed Air Pressure, ASD (21) controls, engine rpm, etc., that are chosen for control logic. Offer alerts to the vehicle operator as necessary:

a. Engine running signal sent to Turn ON ASD (21).

b. Parking brake is released, and the vehicle is put in drive, forward movement mode (auto OR manual transmission) by the vehicle operator.

c. AS the Vehicle (1) steadily accelerates for a preset time, ASD (21) starts the EM (20 &120) motors via respective contactors C1 and C2, in no-load mode (drive clutches FC are not yet engaged) in a predetermined (lead and lag) sequence to limit inrush starting current. ASD (21) puts out only one frequency for both motors and sets the rpm of both motors to be slightly higher than the PTG (5&15) rpm. This will ensure that motors of EM pick up a predetermined percentage of the load of the vehicle's engine. Check with the EM motor manufacturer (speed regulation), the required higher rpm for the motor, in order to pick up the predetermined load.

d. ASD sends a close signal to magnetic clutch FC (23 & 123) setting the EM motors (in constant torque mode). If both motors are of the same size, the power supplied by the ASD (21) may be evenly split (check with ASD manufacturer of any variance).

e. Upon coupling, EM (20 & 120) will pick up some load from the vehicle's engine. The relationship between torque and horsepower of EM (20 &120) is linear based on its rpm (hp=2πNT/33,000 where π is a constant, N is rpm and T is the torque). ASD to keep accelerating using PTG rpm as reference progressively increasing the load on EM (20&120).

f. EM (20&120) to stay coupled to the respective PTG (5 & 15) and transfer power to the vehicle through in constant torque mode till the EM (20&120) reach their power limits OR the PTG is not accelerating to go any faster OR preset elapsed time has reached.

g. As the vehicle picks up speed, the automatic OR manual transmission shifts into higher gears to reduce the engine rpm. Upon reaching preset limits of engine rpm & vehicle speed, ASD to Ramp down the power to a small value before uncoupling (EM)—from PTG, by de-energizing the magnetic clutches FC (23&123) and open the contactors C1 & C2.

h. Note that there will be an upper limit to the rpm (vehicle speed) of PTG as required by the EM motor manufacturer.

i. Battery voltage would be lower than when the vehicle started accelerating. ASD to check the air pressure in the air tank and battery voltage. Activate the air solenoid to operate Air Mot (35) and Air Gen (36) as programmed.

2. Deceleration to Slowdown/Come to Stop (Example 65 to 0 Mph)

The Vehicle moving at a constant speed and the vehicle operator applies the brakes to slow down/stop the vehicle. ASD (21) receives dv/dt (change in the rpm of PTG) signal for following the brake applied signal for a preset time or any other signal that can be used as an input to ASD signal of slowdown of the vehicle for a preset time.

Kinetic Energy Recovery Path [1]:

ASD (21) starts EM (20 & 120) in motor mode (with no load) and brings their rpm close to the PTG (5 & 15) rpm respectively—before turning off power from ASD, to drop EM (20 &120) motor terminal voltage to "zero volts" during the transition. (Check with the EM manufacturer time required to drop the terminal voltage to zero volts upon removal of power from the ASD.)

Vehicle manufacturer may choose to skip starting EM (with no load) using power from ASD—before coupling F/C with PTG with the use of suitable flexible coupling, eliminating need for voltage checks at EM motor terminals. This could increase the regeneration time.

a. ASD (21) checks that contactors C1 and C2 are open before energizing magnetic clutches FC (23 &123) to couple EM (20 & 120) and PE (22 & 122) with the PTG (5 &15) respectively. (Note that attempt to couple EM at higher rpm than the rpm of PTG may result in time delay.)

b. ASD (21) also checks if the pressure in the air tank is below preset upper limit before coupling the Compressor (30) with EM (20) via magnetic clutch (26).

c. ASD checks the voltage of PE (22 &122) to be in the acceptable range and the terminal voltages of EM (20 & 120) are "zero volts" (OR at a low value acceptable to EM and PE manufacturers) before closing contactors (A1& B1) and (A2 & B2).

d. 3 phase voltage from PE (22 & 122) is applied to the stator windings of EM (20 &120) respectively to establish a rotating magnetic field in the stators.

e. By design the rotating magnetic field EM (20 &120) has lower rpm compared to its rotor rpm (slip) that will result in regeneration, whereby torque applied to the EM (20 &120) shafts (minus a small amount of loss) gets converted to electrical energy.

f. 3 phase AC power from EM (20 &120) will be supplied via respective contacts (A1 &B1) and (A2 &B2) to the frontend diode bridges of ASD (21) where it gets converted to DC to be stored in the battery (40). Special controls may be needed to ensure load sharing between frontend diode bridges.

g. Voltage regulators of PE (22 & 122) maintain required voltage from high to low end of the respective EM (20 &120) rpm.

h. As the vehicle slows down, it will not be possible to generate the required voltage at very low rpm due to magnetic saturation. At the preset point, the ASD (21) will open contactors (A1& B1) and (A2 & B2) to disconnect EM (20 &120), PE (22 &122) from the frontend rectifier bridges of the ASD (21).

i. At this point it may still be possible to continue recovery through Kinetic Energy Recovery via Path 2. The vehicle designer may take this into consideration.

Kinetic Energy Recovery Path [2]:

ASD checks if the pressure in the air tank is below preset upper limit before coupling the Compressor (30) with EM (20) via magnetic clutch (26).

a. Compressed air is delivered to a compressed air tank (32). ASD (21) will keep the magnetic clutch (26) closed as long as EM (20) is rotating coupled to PTG (5) AND the air tank pressure is below the upper limit.

b. At a predetermined low rpm of the compressor ASD (21) will de-energize the clutch FC (23) and clutch (26) thereby disengaging Kinetic Energy paths 1 and 2 from PTG (5).

c. By capturing the kinetic energy as compressed air stored in the air tank it can be used to charge the battery when the battery is not receiving charging current from EM (20) and the pressure of the tank is within allowable limits.

d. ASD will operate the air solenoid valve (39) to operate the Air Mot (35) and the Air Gen (36).

e. The voltage regulator of Air Gen (36) will set its output to a preset voltage to charge the battery. By delaying the operation of Air Gen (36), additional KE captured via Path 2 can be transferred to the battery properly.

3. Uniform Acceleration from Lower Speed to Higher Speed. (Example 30 to 65 Mph)

[The Vehicle is Already in Motion.]

a. When ASD (21) senses that the Vehicle (1) is steadily accelerating for a predetermined time, ASD (21) starts the EM (20 &120) motors (with no load) via contactor C1 and C2 (drive clutches F/C are not yet engaged) in a predetermined (lead and lag) sequence to limit inrush starting current.

b. ASD (21) puts out only one frequency for both motors and sets the rpm of both motors to be slightly higher than the PTG (5&15) rpm. This will ensure that motors of EM pick up a predetermined percentage of a load of the vehicle's engine. Check with the EM motor manufacturer (speed regulation), the required higher rpm for the motor, in order to pick up the predetermined load.

c. ASD sends a close signal to magnetic clutch FC (23 & 123) setting the EM (20 &120) in constant torque mode. If both motors are of the same size, the power supplied by the ASD (21) may be evenly split (check with ASD manufacturer of any variance).

d. Upon coupling, EM (20 & 120) will pick up some load from the vehicle's engine. The relationship between torque and horsepower of EM (20 &120) is linear based on its rpm (hp=2πNT/33,000). ASD to keep accelerating using PTG rpm as reference progressively increasing the load on EM (20&120).

e. Rest of the sequence is the same as that of a vehicle accelerating from 0 to 65 mph (items f thru i) for a Multi-Hybrid System vehicle with single—ASD and Battery.

Hybrid System Assist in Reversing the Vehicle.

Using the Hybrid System to assist in reversing the vehicle will not result in significant energy savings as the distance traveled is insignificant compared to a normal mode of travel in the forward direction. Manufacturers may have some special applications for hybrid systems to assist in driving the vehicle in the reverse direction. ASD can reverse the rotation of the EM motor and couple with PTG to work in parallel with the vehicle's engine. The vehicle manufacturer can set the speed and/or time limits via ASD for the duration of Hybrid System assist. Following is a typical scenario.

[Operation Sequence in Reversing the Vehicle]

Multi-Hybrid System Vehicle and Multi-Module Hybrid System Block diagrams 3A and 3B are considered as an example only—not limited to 2 systems.

ASD can reverse the rotation of the EM motor.

The sequence of steps for the reverse motion of the vehicle is (almost) the same as the forward motion.

Regeneration may not be feasible as the vehicle speed will be too low for the Pilot Exciter to supply 3 phase AC excitation to the generator of EM. The vehicle manufacturer can program the ASD to initiate the start of PE and the EM in the generator mode if the vehicle attains enough speed during the reverse motion and brakes are applied to slow the vehicle.

It is desirable to use torque from the engine (due to high gear ratio) to overcome the static friction to set the vehicle in motion from "standstill". Vehicle designers may consider this feature in starting the vehicle from the rest.

As the vehicle may be starting from rest synchronizing rpm of EM with PTG may not be necessary—but can be programmed to do so if necessary. The sequence of operation of a single module hybrid as described below is applicable to each system of the multi-module hybrid system when they are independent of each other.

A. Operation Sequence of Single Module Vehicles and Multi-Module System Vehicles where Multiple Systems are Independent of Each Other.

Vehicle 1 starting from rest and driving in reverse at 5 mph (7.3 ft/sec), (or similar low speed)

Engine (2) is turned "ON" by the vehicle operator. Check the status of Hybrid System components such as—Battery Voltage, Compressed Air Pressure, ASD (21) controls, engine rpm, etc., that are chosen for Hybrid System control logic. Offer alerts to the vehicle operator as necessary:

a. Engine running signal sent to Turn "ON" ASD (21).

b. Parking brake is released, and the vehicle is put in reverse mode (auto OR manual transmission) by the vehicle operator.

c. ASD (21) receives the signal that the transmission is in reverse mode.

d. AS the Vehicle (1) starts to move in the reverse direction, ASD (21) starts the EM (20) motor in the reverse direction (rotation) via contactor C, in no-load mode (drive clutch FC is not yet engaged) and sets the rpm of the motor to be slightly higher than PTG (5) rpm. This will ensure that the motor of EM (20) picks up a predetermined percentage of the load of the vehicle's engine. Check with EM (20) motor manufacturer (speed regulation) the required higher rpm for the motor to pick up the desired load.

e. ASD (21) sends a close signal to magnetic clutch FC (23) setting the EM (20) motor in constant torque mode.

f. Upon coupling, the EM (20) picks up some load from the vehicle's engine. The relationship between torque and horsepower of EM (20) is linear based on its rpm (hp=$2\pi$NT/33,000). ASD (21) to keep accelerating using PTG (5) rpm as reference progressively increasing the load on EM.

g. Additionally, acceleration chosen by the vehicle operator, dv/dt sensor and/or throttle position sensor, can be used to set the torque output by the ASD (21) to EM (20).

h. EM (20) to stay coupled to PTG (5) and transfer power to the vehicle in constant torque mode till the EM (20) reaches its preset power limit or the PTG (5) is not accelerating to go any faster or the pre-set time has reached, or the vehicle came to a stop OR any parameter chosen by the vehicle manufacturer.

i. Upon reaching preset limits ASD (21) to Ramp down the power to EM (20) before uncoupling EM (20)—from PTG (5), by de-energizing the magnetic clutch FC (23) and open the contactor C.

j. Battery voltage would be lower than when the vehicle started accelerating. ASD (21) to check the air pressure in the air tank and battery voltage. Activate the air solenoid to operate Air Mot (35) and Air Gen (36) as programmed to charge the battery.

B. Operation Sequence of Multi-Module Hybrid System Vehicle with a Single-ASD and Battery By using a single ASD to control multiple motors the controls may not be precise (especially when motors are not of the same size) unless the ASD manufacturer can offer a system that can control torque and power input to individual motors.

If precise controls are needed, consider adopting Multi-Module System vehicles where multiple systems are independent of each other (see FIG. 1B).

The air compressors (30 &130), the air tanks (32 &132), and the associated equipment can be consolidated can be combined into a single system as shown on the Multi-Module System Block diagrams 1 & 2.

Vehicle 1 Starting from Rest and Driving in Reverse at 5 Mph. (7.3 Ft/Sec, or Similar Low Speed).

Engine (2) is turned "ON" by the vehicle operator. Check the status of Hybrid System Components such as—Battery Voltage, Compressed Air Pressure, ASD (21) controls, engine rpm, etc., that are chosen for control logic. Offer alerts to the vehicle operator as necessary:

a. Engine running signal sent to Turn ON ASD (21).

b. Parking brake is released, and the vehicle is put in reverse mode (auto OR manual transmission) by the vehicle operator.

c. ASD (21) receives the signal that the transmission is in reverse mode.

d. AS the Vehicle (1) starts to move in the reverse direction, ASD (21) starts the EM (20 &120) motors in the reverse direction (rotation) via respective contactors C1 and C2, in no-load mode (drive clutches F/C are not yet engaged) in a predetermined (lead and lag) sequence. ASD (21) puts out only one frequency for both motors and sets the rpm of both motors to be slightly higher than the PTG (5&15) rpm. This will ensure that motors of EM pick up a predetermined percentage of the load of the vehicle's engine. Check with the EM motor manufacturer the required higher rpm for the motor, in order to pick up the predetermined load.

e. ASD to sends close signal to magnetic clutch FC (23 & 123) setting the EM motors (in constant torque mode). If both motors are of the same size, the power supplied by the ASD (21) may be evenly split (check with ASD of any deviation).

f. Upon coupling, EM (20 &120) pick up some load from the vehicle engine. The relationship between torque and horsepower of EM (20 &120) is linear based on its rpm.

g. EM (20&120) to stay coupled to the respective PTG (5 &15) and transfer power to the vehicle through in constant torque mode till the EM (20&120) reach its preset power limit or the PTG is not accelerating to go any faster OR preset elapsed time has reached or any parameter is chosen by the vehicle manufacturer.

h. Upon reaching preset limits, ASD to Ramp down the power to a small value before uncoupling EM—from PTG, by de-energizing the magnetic clutch FC (23&123) and open the contactors C1 & C2.

i. Battery voltage would be lower than when the vehicle started accelerating. ASD to check the air pressure in the air tank and battery voltage. Activate the air solenoid to operate Air Mot (35) and Air Gen (36) as programmed.

Other Modes of Operation: A motor vehicle will be operating on different terrains requiring acceleration and deceleration. The Hybrid system can be turned on as needed similar to a cruise control controlling the throttle to maintain a constant speed. The vehicle manufacturer can program the ASD (21) to operate in parallel with the engine when acceleration is needed and enter in regeneration mode when going down a slope and the vehicle operator is trying to slow down the vehicle by gentle application of the brakes or partial release of the throttle. Other conditions include but not limited to the operation of the hybrid system—when the vehicle is operating at a steady speed and the compressed air tank is at or very close upper-pressure limit (as chosen by the vehicle manufacturer) the ASD (21) may be programmed the operate EM (single or multiple) in parallel to with the engine for a predetermined period of time, followed by operating the Air Mot (35) and Air Gen (36) to replenish all or part of the energy used. This step will make room in the compressed air tank to accept the storage of Compressed air (kinetic energy) during the next deceleration event.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A hybrid system for capturing kinetic energy of a vehicle, the hybrid system comprises:

an electric machine configured to be switched between a motor mode and a generator mode, in the motor mode the electric machine drives the vehicle using energy stored in a battery, in the generator mode the electric machine is driven by the kinetic energy of the vehicle;

an air compressor operably coupled to the electric machine through a magnetic clutch;

a tank for storing air under pressure compressed by the air compressor; and an adjustable speed drive configured to detect air pressure in the tank, wherein the adjustable speed drive configured to engage the magnetic clutch such as the electric machine mechanically drives the air compressor while in the generator mode, wherein the adjustable speed drive disengages the magnetic clutch when the electric machine is in the motor mode, wherein engagement of the magnetic clutch in the generator mode further depends upon the air pressure in the tank.

2. The hybrid system according to claim 1, wherein the hybrid system further comprises an air-motor fluidly coupled to the tank, the air motor configured to be driven by the compressed air generating electrical energy.

3. The hybrid system according to claim 2, wherein the hybrid system further comprises a control unit configured to convert the electrical energy from the air motor to DC power for charging the battery, the control unit operably coupled to the air motor for controlling the operation of the air motor, the control unit is configured for operating the air motor for charging of the battery and not to operate the air motor when the electric machine is in the generator mode.

4. The hybrid system according to claim 1, wherein the hybrid system further comprises an electric motor to drive the air compressor, the electric motor powered by an external power supply.

5. The hybrid system according to claim 4, wherein the electric motor is connected to a plugin receptacle in the vehicle for connecting to the external power supply.

6. The hybrid system according to claim 3, wherein the electric machine in the generator mode generates regenerative electrical energy from the kinetic energy, wherein the regenerative electrical energy charges the battery.

7. The hybrid system according to claim 1, wherein the adjustable speed drive further configured to:
detect slowing down of the vehicle;
upon slowing of the vehicle, switch the electric machine from the motor mode to the generator mode;
upon switching of the electric machine to the generator mode, engage the magnetic clutch for mechanically driving the air compressor by the electric machine.

8. The hybrid system according to claim 7, wherein the adjustable speed drive is further configured to:
limit power supply to the electric machine in the motor mode to a lesser value than the capacity of the electric machine, and
use the electric machine at full capability in the generator mode.

9. A vehicle comprising:
an internal combustion engine coupled to a differential; and
a hybrid system coupled to the differential through a power takeoff gear, the hybrid system comprises:
an electric machine configured to be switched between a motor mode and a generator mode, in the motor mode the electric machine drives the vehicle using energy stored in a battery, in the generator mode the electric machine is driven by the kinetic energy of the vehicle;
an air compressor operably coupled to the electric machine through a magnetic clutch;
a tank for storing air under pressure compressed by the air compressor;
an air-motor configured to be operated by the compressed air for generating electrical energy; and
an adjustable speed drive configured to detect an air pressure in the tank, wherein the adjustable speed drive configured to engage the magnetic clutch such as the electric machine mechanically drives the air compressor while in the generator mode,
wherein the adjustable speed drive disengages the magnetic clutch when the electric machine is in the motor mode,
wherein engagement of the magnetic clutch in the generator mode further depends upon the air pressure in the tank.

10. The vehicle according to claim 9, wherein the electric machine is configured to simultaneously charge the battery and mechanically drive the air compressor.

11. The vehicle according to claim 9, wherein the adjustable speed drive is further configured to:
power the electric machine in the motor mode for driving the vehicle;
detect application of brake;
upon detecting the application of the brake, switch the electric machine to the generator mode;
detect the air pressure in the tank; and
upon detecting the air pressure, engage the magnetic clutch for the electric machine to mechanically drive the air compressor.

12. The vehicle according to claim 11, wherein the adjustable speed drive is further configured to operate the air-motor for charging the battery.

13. The vehicle according to claim 11, wherein the adjustable speed drive is further configured to:
limit power supply to the electric machine in the motor mode to a lesser value than the capacity of the electric machine, and
use the electric machine at full capability in the generator mode.

* * * * *